US010315900B2

(12) United States Patent
Goncalves et al.

(10) Patent No.: US 10,315,900 B2
(45) Date of Patent: Jun. 11, 2019

(54) CASTER WHEEL WITH CONSTANT FORCE MECHANISM

(71) Applicants: Fernando D. Goncalves, Binghamton, NY (US); Paul F. Finnegan, Windsor, NY (US); Greg Sigman, Sherburne, NY (US); Michael V. Brown, Endicott, NY (US)

(72) Inventors: Fernando D. Goncalves, Binghamton, NY (US); Paul F. Finnegan, Windsor, NY (US); Greg Sigman, Sherburne, NY (US); Michael V. Brown, Endicott, NY (US)

(73) Assignee: The Raymond Corporation, Greene, NY (US)

( * ) Notice: Subject to any disclaimer, the term of this patent is extended or adjusted under 35 U.S.C. 154(b) by 529 days.

(21) Appl. No.: 14/242,491

(22) Filed: Apr. 1, 2014

(65) Prior Publication Data

US 2015/0274495 A1    Oct. 1, 2015

(51) Int. Cl.
*B60B 33/00* (2006.01)
*B60G 11/14* (2006.01)
(Continued)

(52) U.S. Cl.
CPC ........ *B66F 9/07586* (2013.01); *B60B 33/045* (2013.01); *B60G 3/02* (2013.01);
(Continued)

(58) Field of Classification Search
CPC ...... B66F 9/075; B66F 9/07586; B66F 9/065; B66F 17/006; B60G 3/20; B60G 3/02;
(Continued)

(56) References Cited

U.S. PATENT DOCUMENTS 1,242,500 A * 10/1917 Wilcox ......................... 180/209
1,906,238 A    5/1933 Ramsey et al.
(Continued)

FOREIGN PATENT DOCUMENTS

CN    101112856 A    1/2008
EP    0556543 A2    8/1993
(Continued)

OTHER PUBLICATIONS

European Search Report; Appln. No. EP15161975; 8 pages; dated Aug. 10, 2015.
(Continued)

*Primary Examiner* — Joseph J Hail
*Assistant Examiner* — Arman Milanian
(74) *Attorney, Agent, or Firm* — Quarles & Brady LLP

(57) ABSTRACT

A wheel assembly includes a constant force mechanism and a wheel coupled to the constant force mechanism. The wheel is displaceable in at least one dimension, and the constant force mechanism imparts a substantially constant force on the wheel in the dimension. In one aspect, the wheel is displaceable in a first regime and a second regime. For a wheel displacement in the first regime, the constant force mechanism imparts a substantially constant force on the wheel, and for a wheel displacement in the second regime, the constant force mechanism imparts a variable force on the wheel. The variable force can be linear or non-linear to the magnitude of the displacement in the second regime and is equal to or greater than the substantially constant force.

23 Claims, 17 Drawing Sheets

(51) Int. Cl.
*B60G 11/18* (2006.01)
*B60G 3/20* (2006.01)
*B66F 9/065* (2006.01)
*B66F 9/075* (2006.01)
*B60G 3/02* (2006.01)
*G08B 21/18* (2006.01)
*B60B 33/04* (2006.01)
*B62B 5/00* (2006.01)
*B62B 3/06* (2006.01)

(52) U.S. Cl.
CPC .............. *B62B 3/0612* (2013.01); *B62B 5/00* (2013.01); *B66F 9/065* (2013.01); *G08B 21/18* (2013.01); *B62B 2301/23* (2013.01)

(58) Field of Classification Search
CPC ...... B60G 17/016; G08B 21/18; B60B 33/00; B60B 33/0028; B60B 33/045; B62D 1/06; B62B 2301/23; B62B 3/0612
USPC ................. 16/44; 180/411; 254/2 R
See application file for complete search history.

(56) References Cited

U.S. PATENT DOCUMENTS

| | | | |
|---|---|---|---|
| 2,339,940 A * | 1/1944 | Noros | B62B 1/08 280/46 |
| 2,438,571 A * | 3/1948 | Maxon, Jr. | B60G 17/005 254/2 C |
| 2,443,480 A * | 6/1948 | Schwitzer | B62D 51/005 180/13 |
| 2,709,829 A | 6/1955 | Marvin | |
| 2,831,699 A * | 4/1958 | Holmes | B60G 11/14 16/35 R |
| 2,891,764 A | 6/1959 | Peame | |
| 3,380,546 A * | 4/1968 | Rabjohn | B60L 11/1805 180/15 |
| 4,000,912 A | 1/1977 | Donale et al. | |
| 4,246,567 A | 1/1981 | Miller | |
| 4,263,979 A * | 4/1981 | Sturgill | B62D 7/1509 180/411 |
| 4,371,191 A * | 2/1983 | Goldberg | B60G 3/26 280/5.501 |
| 4,449,725 A | 5/1984 | Robinson et al. | |
| 4,534,433 A | 8/1985 | Burbank et al. | |
| 4,598,784 A * | 7/1986 | Tronich | B60G 17/02 180/19.2 |
| 4,637,093 A | 1/1987 | Kassai | |
| 4,750,579 A * | 6/1988 | Jarl | B60G 17/0272 180/209 |
| 4,805,710 A * | 2/1989 | Jarl | B60G 17/0272 180/209 |
| 4,884,936 A * | 12/1989 | Kawada | B62B 3/04 280/43.12 |
| 5,072,960 A | 12/1991 | Sperko | |
| 5,099,708 A * | 3/1992 | Chung | B21D 28/32 74/110 |
| 5,551,119 A * | 9/1996 | Worwag | A47L 9/0411 15/319 |
| 5,579,859 A * | 12/1996 | Quellhorst | B62D 33/0604 180/89.13 |
| 5,590,735 A | 1/1997 | Cartier | |
| 5,628,377 A * | 5/1997 | Le Gloan | B60B 33/04 16/18 B |
| 5,649,454 A | 7/1997 | Midha et al. | |
| 5,685,555 A * | 11/1997 | McCormick | B60G 13/04 267/196 |
| 6,244,025 B1 * | 6/2001 | Ferris | A01D 34/64 56/15.8 |
| 6,357,077 B1 | 3/2002 | Jones, Jr. et al. | |
| 6,484,359 B1 | 11/2002 | Guttmann et al. | |
| 6,543,798 B2 | 4/2003 | Schaffner et al. | |
| 6,550,101 B2 * | 4/2003 | Plate | B60B 33/04 16/19 |
| 6,604,414 B1 | 8/2003 | Claussen et al. | |
| 6,759,952 B2 | 7/2004 | Dunbridge et al. | |
| 6,940,415 B2 | 9/2005 | Nagata et al. | |
| 7,017,228 B2 * | 3/2006 | Silverstein | B60B 33/0005 16/18 R |
| 7,070,028 B2 * | 7/2006 | Reybrouck | F16F 9/36 188/282.8 |
| 7,093,319 B2 | 8/2006 | Lemeur, Jr. et al. | |
| 7,267,349 B2 | 9/2007 | Sica et al. | |
| 7,497,449 B2 * | 3/2009 | Logger | B60B 33/045 16/19 |
| 7,593,797 B2 * | 9/2009 | Izawa | B60G 17/0165 267/218 |
| 7,762,129 B2 | 7/2010 | Niklas et al. | |
| 7,770,904 B2 * | 8/2010 | Passeri | B62B 3/0612 280/43.12 |
| 7,782,183 B2 | 8/2010 | Wieser | |
| 7,861,820 B1 * | 1/2011 | Goodwin | B62D 7/09 180/408 |
| 7,874,223 B2 | 1/2011 | Sugar et al. | |
| 7,896,358 B2 * | 3/2011 | Hoff | B66F 17/003 180/282 |
| 7,918,514 B2 | 4/2011 | Dal Pra' | |
| 8,356,688 B2 * | 1/2013 | Passeri | B62B 5/06 180/326 |
| 8,720,616 B2 * | 5/2014 | Kofoed | A61G 7/08 180/13 |
| 8,731,785 B2 * | 5/2014 | McCabe | B60G 17/016 187/222 |
| 8,733,770 B2 * | 5/2014 | Nafziger | B62D 7/00 280/93.502 |
| 8,763,990 B2 * | 7/2014 | Day | B62B 3/001 254/2 B |
| 9,002,557 B2 * | 4/2015 | Goncalves | B66F 9/24 414/635 |
| 9,085,203 B2 * | 7/2015 | Duppong | B60C 23/067 |
| 9,168,784 B2 | 10/2015 | DeChristopher et al. | |
| 9,302,893 B2 * | 4/2016 | Goncalves | B66F 17/003 |
| 9,403,667 B2 * | 8/2016 | McCabe | B60G 17/08 |
| 9,533,863 B2 * | 1/2017 | Plachta | B66F 9/07586 |
| 9,956,822 B1 * | 5/2018 | Yu | B60B 33/045 |
| 2004/0055108 A1 * | 3/2004 | Lemeur, Jr. | B60B 33/045 16/44 |
| 2005/0144923 A1 * | 7/2005 | Melone | A01D 34/64 56/14.7 |
| 2005/0156391 A1 * | 7/2005 | Krenzin | B66F 9/07586 280/5.515 |
| 2006/0090885 A1 | 5/2006 | Raslas | |
| 2006/0213305 A1 * | 9/2006 | Sugar | B25J 19/0016 74/490.01 |
| 2006/0231312 A1 | 10/2006 | Passeri | |
| 2011/0126617 A1 * | 6/2011 | Bengoechea Apezteguia | B60C 23/068 73/146 |
| 2012/0049610 A1 | 3/2012 | Lew | |
| 2012/0235100 A1 * | 9/2012 | McCabe | B60G 17/08 254/2 R |
| 2013/0278406 A1 * | 10/2013 | Weston | B60C 23/0488 340/442 |
| 2014/0060715 A1 * | 3/2014 | Winshtein | B60B 9/005 152/7 |
| 2014/0260233 A1 * | 9/2014 | Giovanardi | F15B 13/0444 60/431 |
| 2015/0274495 A1 | 10/2015 | Goncalves et al. | |

FOREIGN PATENT DOCUMENTS

| | | | |
|---|---|---|---|
| EP | 1022166 A2 | 7/2000 | |
| EP | 1588979 A2 | 10/2005 | |
| EP | 1022166 B1 | 10/2008 | |
| FR | 2544259 A1 | 10/1984 | |
| JP | 11180104 A | 7/1999 | |
| JP | 2000142012 A | 5/2000 | |
| JP | 2002087039 A | * 3/2002 | ......... B60B 33/0028 |
| JP | 2003079671 A | 3/2003 | |

(56) References Cited

FOREIGN PATENT DOCUMENTS

| JP | 2005350154 A | * | 12/2005 | ......... B60B 33/0028 |
| JP | 2010089615 A | | 4/2010 | |
| JP | 2011046336 A | * | 3/2011 | ......... B60B 33/0028 |

OTHER PUBLICATIONS

FR 2544259 Espacenet Machine Translation Description; 3 pages.
P41703705EP00 European Search Report; dated Dec. 12, 2017; 7 pages.
First Office Action issued in corresponding Chinese Patent Application No. 201510271776.1, dated Jun. 5, 2018, 16 pages.

* cited by examiner

CASTER WHEEL WITH CONSTANT FORCE MECHANISM

CROSS REFERENCES TO RELATED APPLICATIONS

Not Applicable.

STATEMENT REGARDING FEDERALLY SPONSORED RESEARCH

Not Applicable.

BACKGROUND OF THE INVENTION

The present invention relates to a wheel assembly for a vehicle, and more particularly to a wheel assembly for a material handling vehicle such as a pallet truck.

Vehicles, such as material handling vehicles (e.g., pallet trucks, reach trucks, counterbalance trucks, tow tractors, order pickers, etc.), utility carts, wagons, etc. incorporate wheels in a variety of roles, such as a drive wheel, a steering wheel, a support wheel, or some combination thereof. In some configurations, the wheel assembly includes a caster wheel. All of the wheels will wear over time and will eventually require maintenance to repair or replace the wheel.

In the material handling industry increased load carried by the wheels, smaller wheel diameters, and higher rotational velocities of the wheels tend to exacerbate the wear, further impacting the useful life of a wheel.

A material handling vehicle, and in particular, a pallet truck is often equipped with a main drive wheel and one or more additional wheels. These additional wheels, which may be casters, are included, for example, to enhance handling and maneuverability. Although casters behave well when properly maintained, it can be possible for the caster to fall out of adjustment as the drive wheel wears. Adjusting casters can be a time consuming process.

Traditional casters require periodic adjustment to compensate for drive wheel wear. This adjustment is normally done by adding or removing shims between the caster and the vehicle to raise or lower the caster. The adjustment process can be labor intensive. In certain cases, to adjust the caster, the vehicle must be elevated and the caster must be removed before shims can be added or removed.

More advanced casters have adjustment screws that can raise or lower the caster to facilitate periodic adjustments. The adjustment screws can be accessed from the side on some designs and from the top on others. In this case, the casters can be adjusted without removing the caster but the adjustment point is under the vehicle. Top adjust casters provide an easier access point but require a hole in the operator floor.

Fundamentally, a disadvantage of current caster systems for material handling vehicles is the necessity for periodic adjustment. Therefore, a need exists for an improved wheel assembly for a vehicle that reduces the frequency of periodic adjustments of the caster wheels. Furthermore, a need exists for a means for providing a definitive indication to assist maintenance technicians in determining when drive wheel or caster wheel repair or replacement is required.

SUMMARY

The present disclosure provides a caster wheel assembly that may require less frequent adjustment in the field in response to drive wheel wear. In one embodiment, the caster wheel assembly may generate a constant downward force as the drive wheel wears. The caster wheel assembly may be tuned to provide an appropriate nominal downward force. This downward force may be tunable based on desired vehicle performance characteristics. As the drive wheel wears, the deflection across the caster may increase while the caster force remains fixed at the nominal level. In some embodiments, the desired force profile may be achieved with a caster wheel assembly including a constant force mechanism. The constant force mechanism may enable the caster wheel to apply a constant downward force on a ground contact surface throughout the operation of the material handling vehicle. In some embodiments, a variable constant force mechanism may include a secondary spring element that may provide additional resistance once the deflection of the caster wheel exceeds a threshold value.

The present disclosure generally provides a wheel assembly including a constant force mechanism and a wheel coupled to the constant force mechanism. The wheel is displaceable in at least one dimension, and the constant force mechanism imparts a substantially constant force on the wheel in the at least one dimension. In some embodiments, for a wheel displacement greater than a predetermined wheel displacement, a variable constant force mechanism can impart a variable force on the wheel, and wherein the variable force is equal to or greater than the substantially constant force. In another aspect, the wheel is displaceable in a first regime and a second regime. For a wheel displacement in the first regime, the constant force mechanism imparts a substantially constant force on the wheel, and for a wheel displacement in the second regime, a variable constant force mechanism imparts a variable force on the wheel. The variable force can be linear or non-linear to the magnitude of the displacement in the second regime and can be equal to or greater than the substantially constant force.

In one aspect, the wheel assembly further includes a sensor coupled to the wheel in order to measure a property of the wheel. The sensor is coupled to a sensor system that can generate a signal when a measured deflection of the wheel exceeds a predetermined threshold. In another aspect, the signal communicates a status of the wheel. In still another aspect, the sensor system can determine an average deflection across the wheel.

In another aspect, the constant force mechanism includes a first support structure and a second support structure. The first support structure is arranged at a substantially right angle to the second support structure. A first carriage is movable along a length of the first support structure, and a second carriage is movable along a length of the second support structure. A rigid arm is pivotally connected to the first and second carriages. A first resistance device opposes movement of the first carriage along the length of the first support structure, a second resistance device opposes movement of the second carriage along the length of the second support structure, and in some embodiments a third resistance device can be included to further oppose movement of one of the first and second carriages. In a first regime, the constant force mechanism imparts the substantially constant force on the wheel for a translational displacement less than a distance X along one of the length of the first support structure and the length of the second support structure, and in a second regime, the variable constant force mechanism imparts the variable force on the wheel for a translational displacement equal to or greater than a distance X along one of the length of the first support structure and the length of the second support structure.

In another embodiment, a method of indicating a maintenance requirement includes the steps of: (i) providing a sensor configured to measure a status of a wheel assembly on a material handling vehicle; (ii) measuring the status of the wheel assembly; and (iii) communicating a signal that provides an indication for maintenance of the wheel assembly.

In another embodiment, a wheel assembly includes a constant force mechanism and a wheel coupled to the constant force mechanism, the constant force mechanism exerting a force on the wheel resisting displacement of the wheel. A sensor measures deflection of the wheel.

In one aspect, for a wheel deflection in a first regime, the constant force mechanism imparts a substantially constant force on the wheel, and for a wheel displacement in a second regime, a variable constant force mechanism imparts a variable force on the wheel, wherein the variable force is proportional to the magnitude of the deflection in the second regime, and wherein the variable force is equal to or greater than the substantially constant force.

In another embodiment, a material handling vehicle comprises a vehicle chassis; a fork carriage coupled to the vehicle chassis; at least one lifting fork coupled to the fork carriage and displaceable in at least one dimension; a drive wheel coupled to the vehicle chassis; at least one caster wheel assembly coupled to the vehicle chassis, the at least one caster wheel assembly including a constant force mechanism and a caster wheel, the caster wheel coupled to the constant force mechanism; and the constant force mechanism exerts a force on the caster wheel resisting displacement of the caster wheel.

These and still other aspects will be apparent from the description that follows. In the detailed description, preferred example embodiments will be described with reference to the accompanying drawings. These embodiments do not represent the full scope of the invention; rather the invention may be employed in other embodiments. Reference should therefore be made to the claims herein for interpreting the breadth of the invention.

DETAILED DESCRIPTION

Figure 1:
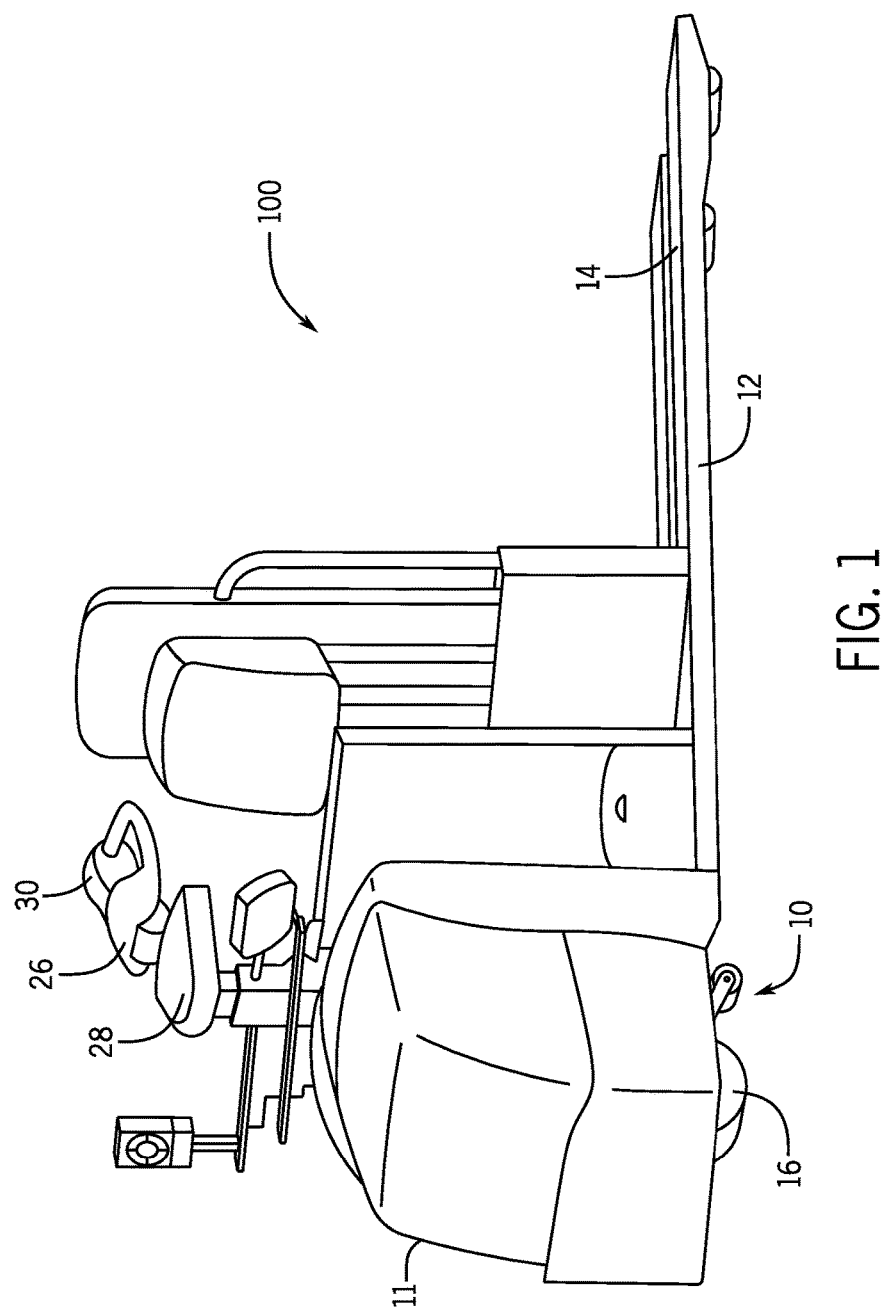
FIG. 1 is a front perspective view of a material handling vehicle equipped with a caster with a constant force mechanism and a position sensor system.
Figure 2:
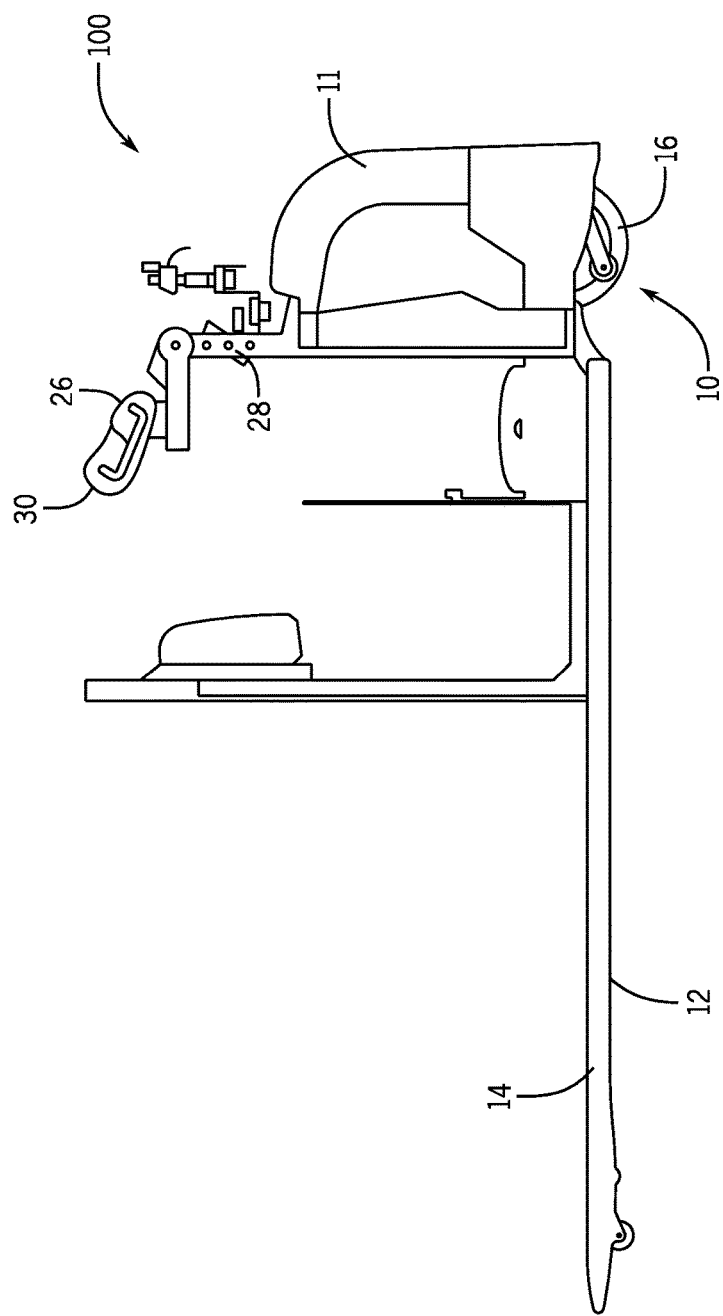
FIG. 2 is a side view of a material handling vehicle equipped with a caster with a constant force mechanism and a position sensor system.
Figure 3:
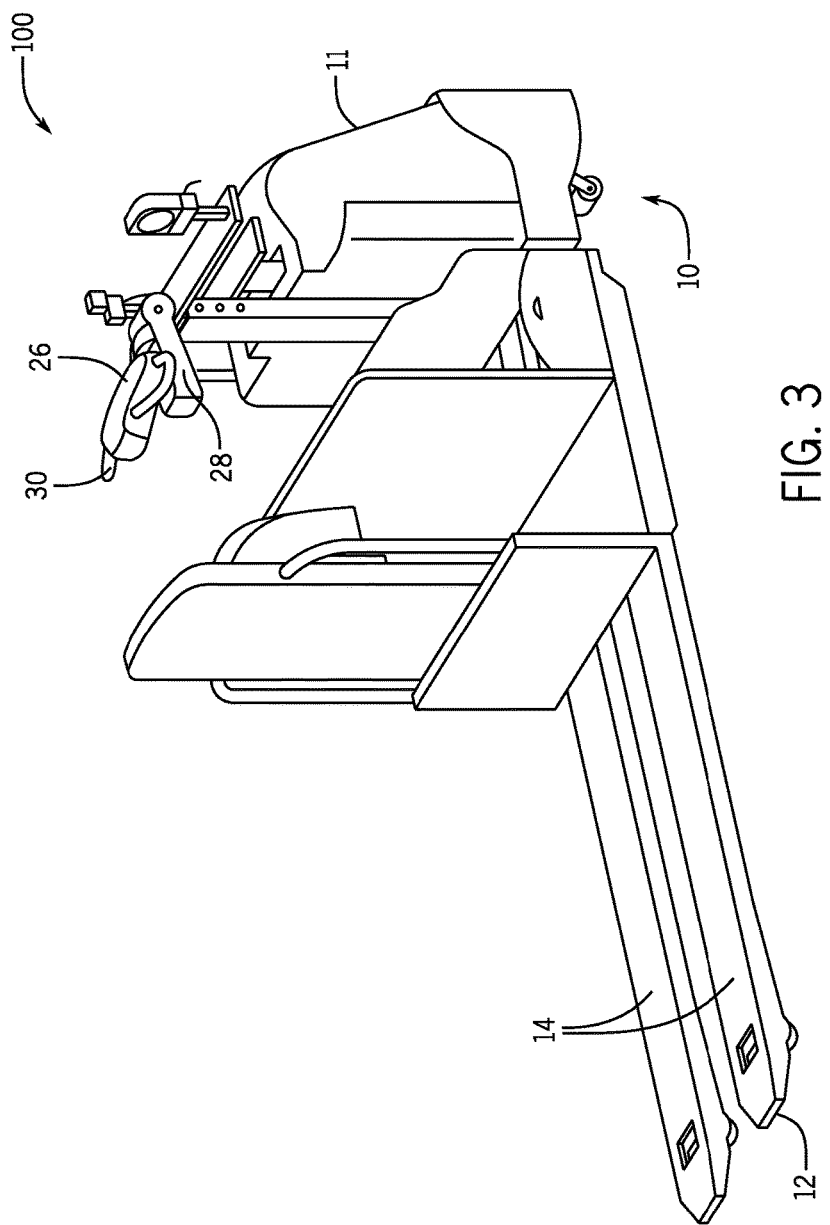
FIG. 3 is a rear perspective view of a material handling vehicle equipped with a caster with a constant force mechanism and a position sensor system.
Figure 4:
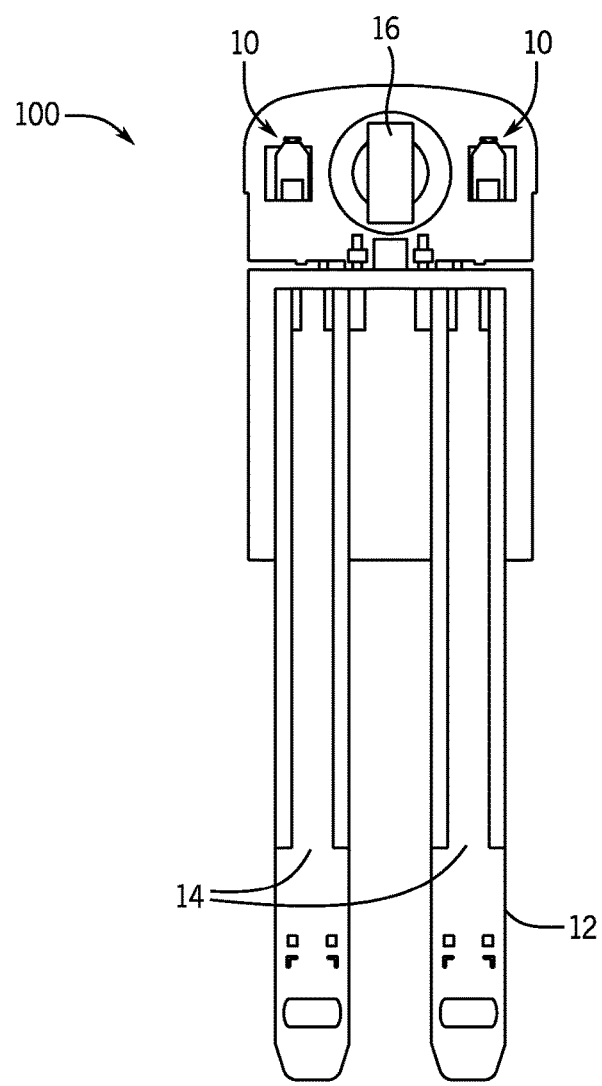
FIG. 4 is a bottom view of a material handling vehicle equipped with a caster with a constant force mechanism and a position sensor system.

Several example embodiments of wheel assemblies, including a caster with a constant force mechanism and a caster with a variable constant force mechanism will be described. As one skilled in the art will appreciate, however, the wheel assembly concept may be implemented in a variety of different configurations and arrangements. Moreover, while the example wheel assembly is generally described with reference to a pallet truck, the wheel assembly concept is equally applicable to other types and styles of powered and unpowered vehicles, such as pallet trucks, tow tractors, sideloaders, counterbalanced trucks, reach trucks, wagons, utility trailers, and the like, as non-limiting examples.

A vehicle in the form of a pallet truck is illustrated in FIGS. 1-4. A motorized hand/rider low-lift pallet truck 100 is comprised of fork carriage 12 having a pair of load bearing forks 14 that are coupled to a power unit 11. The power unit 11 typically includes a housing that houses a hydraulic lift motor pump and traction motor, a drive wheel 16, and a battery housing that houses a battery. Alternatively, the battery can be mounted directly to the pallet truck 100 without a housing. The drive wheel 16 is coupled to a steering mechanism 26 having a tiller arm 28 and an operator control handle 30. The steering mechanism 26 is rotatable to the right and left to control the steering of the pallet truck 100.

The fork carriage 12 has a vertical span of several inches, traveling up and down between ground level and the maximum height. The pallet truck 100 is designed such that the forks 14 are inserted under a load to be moved such as a pallet of goods and the fork carriage 12 lifts the load off of the ground. The pallet truck 100 may be driven to another location where the fork carriage 12 is lowered to place the load on the ground and the forks 14 are withdrawn from the load. One skilled in the art will appreciate the operation and interconnection of the various components of the example pallet truck 100.

Figure 5:
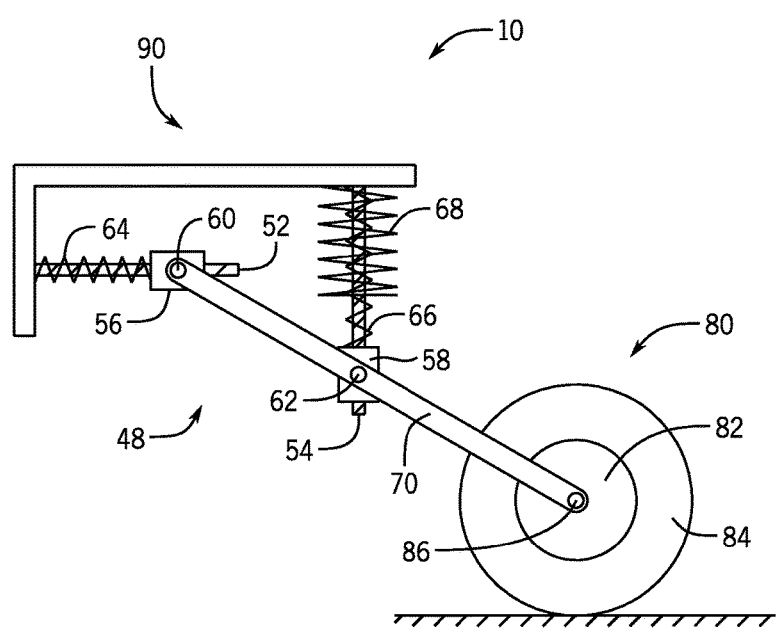
FIG. 5 is a schematic illustration of an embodiment of a caster with a variable constant force mechanism.
Figure 6:
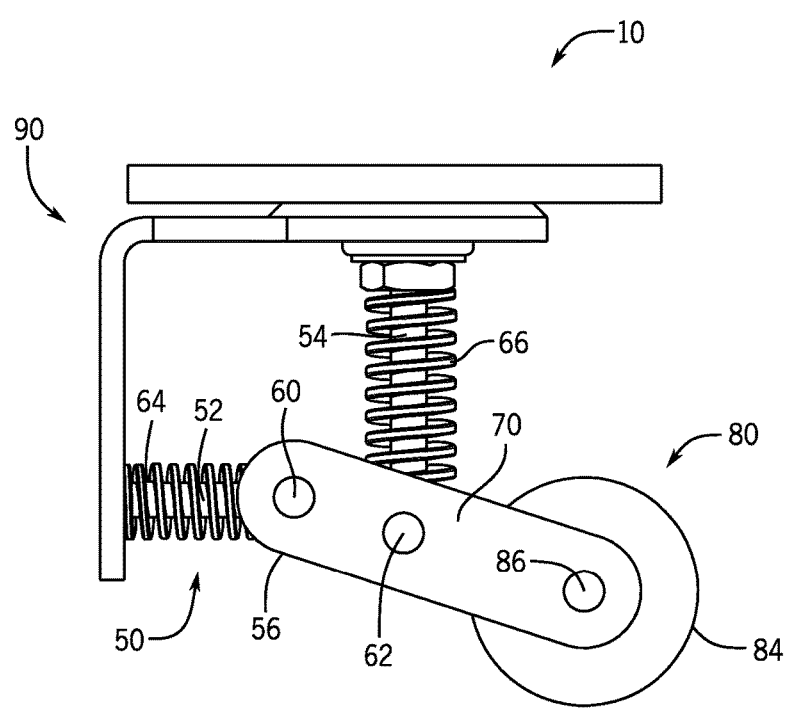
FIG. 6 is a side view of an embodiment of a caster with a constant force mechanism.
Figure 7A:
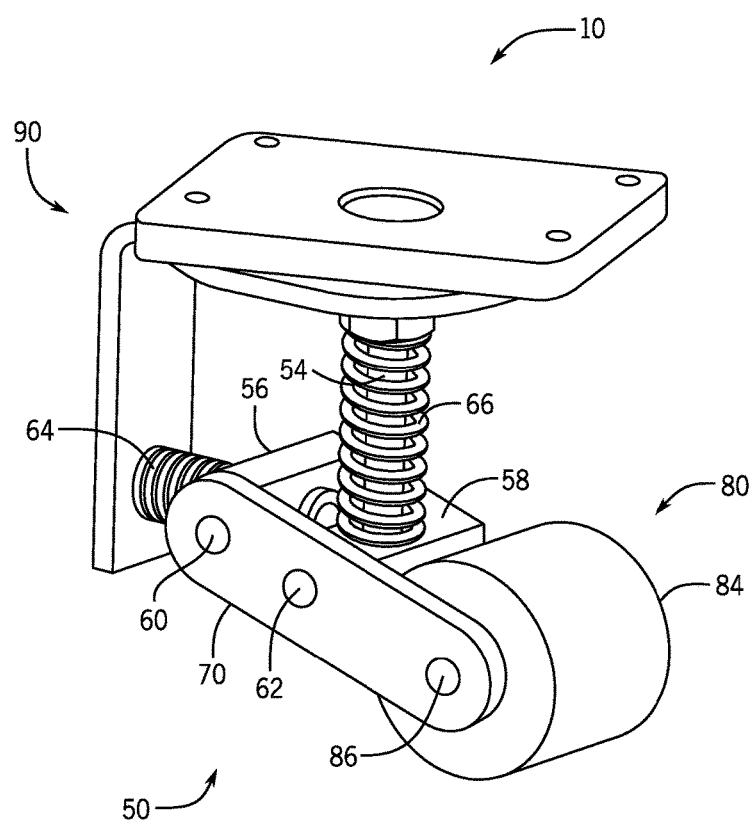
FIG. 7A is a perspective view of a caster with a constant force mechanism as seen in FIG. 6.
Figure 7B:
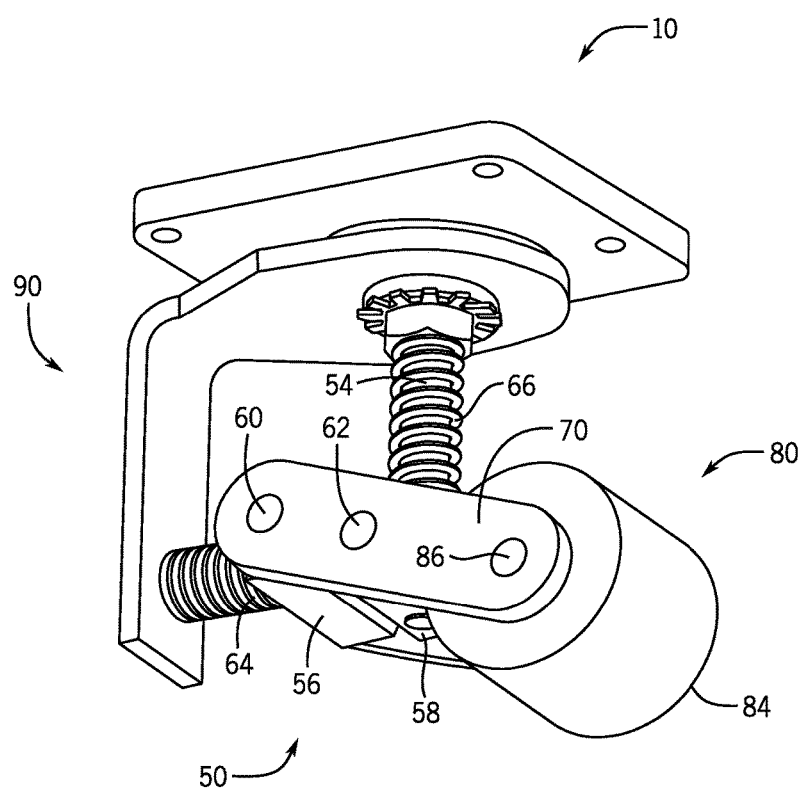
FIG. 7B is an alternate perspective view of the caster with a constant force mechanism of FIG. 6.
Figure 8A:
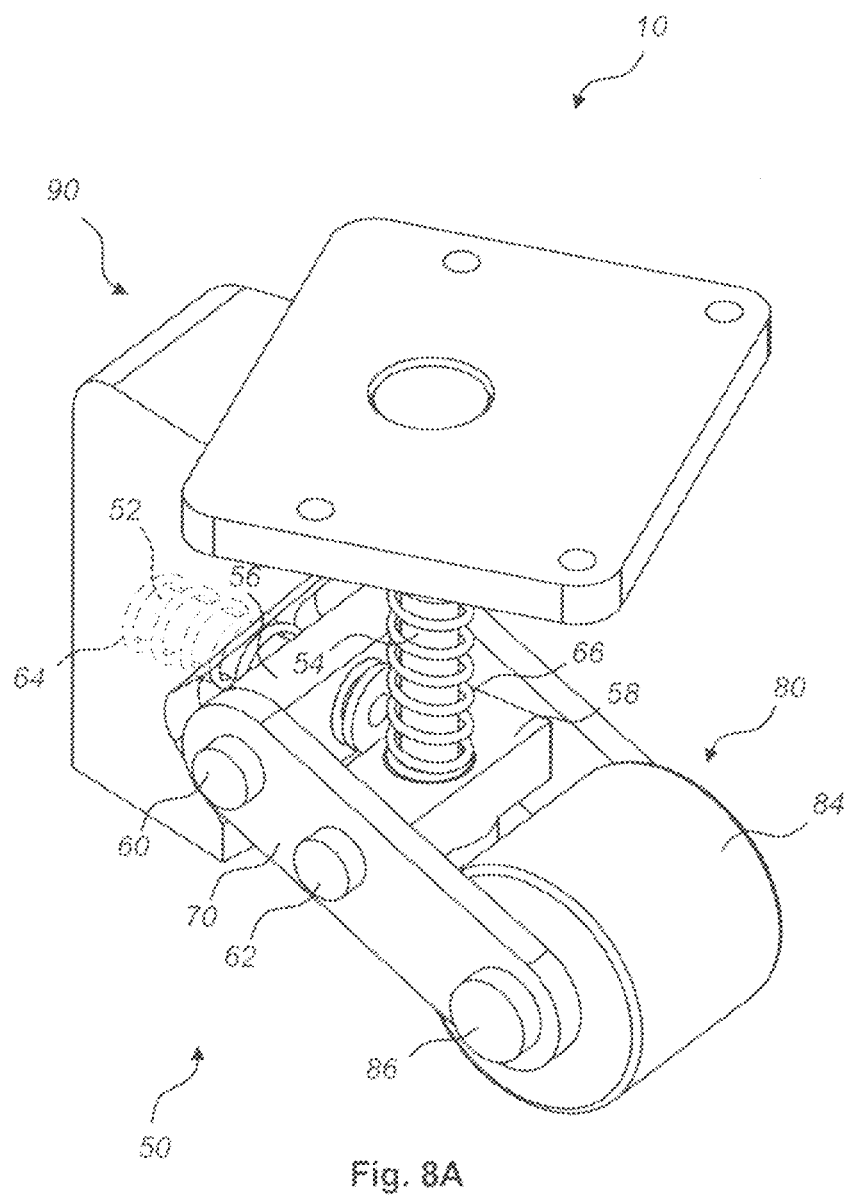
FIG. 8A is a perspective view of an alternative embodiment of a caster with a constant force mechanism.
Figure 8B:
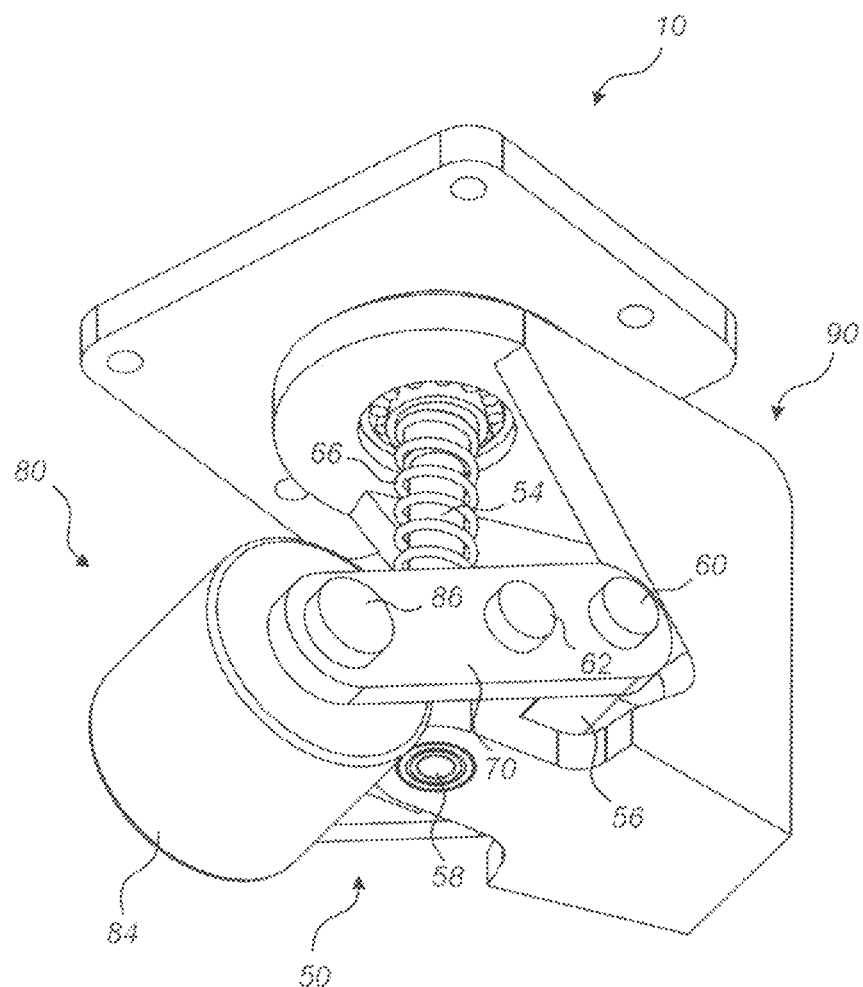
FIG. 8B is an alternate perspective view of the caster with a constant force mechanism of FIG. 8A.

Regarding the example pallet truck 100, one or more wheel assemblies 10 are positioned at the base of the pallet truck 100 and can be positioned near the drive wheel 16. In one embodiment, the wheel assemblies 10 are casters. Referring to FIG. 5, the wheel assembly 10 can include features such as a support 90, a wheel 80, and a variable constant force mechanism 48. In the illustrated embodiment, wheel 80 is coupled to variable constant force mechanism 48, which is in turn coupled to support 90. Furthermore, support 90 can be pivotally coupled to pallet truck 100. In other embodiments illustrated in FIGS. 6-8B, a constant force mechanism 50 is shown. A secondary spring 68 (discussed below) can be included to provide the "variable" feature to produce the variable constant force mechanism 48.

The wheel 80 is illustrated as a caster-type wheel including a hub 82 about which a tire 84 is secured. In one form, the hub 82 is metallic (e.g., steel) and the tire 84, which may be non-metallic (e.g., plastic, such as, polyurethane), is molded over or secured to the hub 82. An axle 86 extends through from the wheel 80 to couple to a rigid arm 70, which is a component of the variable constant force mechanism 48. Snap rings, clips, or any other restraint may be used to capture the axle 86, as will be appreciated by one skilled in the art given the benefit of this disclosure.

While the axle 86 defines a circular cross-section in a plane perpendicular to the longitudinal axis of the axle 86, many other form factors are available, such as square, hexagonal, triangular, and the like. Furthermore, any number and/or type of wheels 80 may be supported by the axle 86; for instance, a pair of solid rubber wheels may be supported by the axle 86, or one or more plastic wheels may be incorporated.

Figure 9:
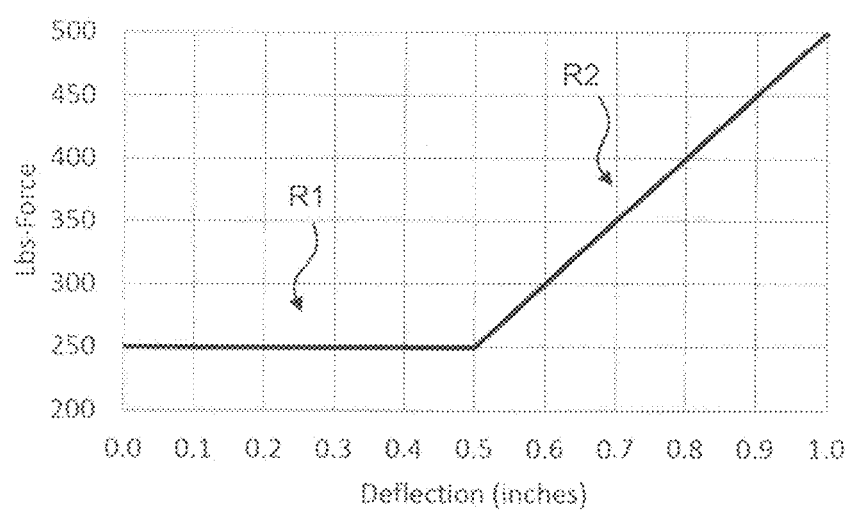
FIG. 9 is an example of a force profile for two operating regimes (R1, R2) of a caster with a variable constant force mechanism.

During operation of the pallet truck 100, the wheel assemblies 10 can be tuned to provide an appropriate nominal downward force throughout a first operating regime R1 (e.g., 250 lbs in FIG. 9). This downward force can be tunable based on desired vehicle performance characteristics. As the drive wheel 16 wears, the deflection across the wheel 80 will increase but the force applied to the wheel 80 remains fixed at the nominal level. In a second operating regime (R2 in FIG. 9) where the deflection across the wheel 80 exceeds a predetermined threshold value (e.g. 0.5 inches in FIG. 9), the force applied by the wheel assembly 10 can be increased to accommodate large deflection events such as turning. In a turning event, the deflection can exceed the predetermined value and the wheel assembly 10 can provide the appropriate roll stiffness. Whereas FIG. 9 illustrates a linear increase in force as deflection increases beyond a predetermined threshold, a non-linear force profile may also be used. In one aspect, operating regimes R1 and R2 and corresponding force profiles can vary and may be chosen based on realistic drive wheel 16 wear rates. Moreover, in some embodiments, only a single operating regime may be implemented, whereas in other embodiments, two, three or more operating regimes may be implemented.

The constant force operating regime can be variable and can be chosen based on realistic drive wheel 16 wear rates. Realizing the proposed wheel force profile would reduce the frequency of maintenance required to maintain optimal vehicle performance. One way to achieve the desired force profile can be to use a constant force mechanism. Many constant force mechanisms exist in the art and an example of such a mechanism is shown in U.S. Pat. No. 7,874,223, which is herein incorporated by reference in its entirety. This type of constant force mechanism can be incorporated into a wheel assembly 10 as shown in FIG. 5 to resist displacement of the wheel 80 in the wheel assembly 10. The illustrated variable constant force mechanism 48 includes a horizontal support 52 and a vertical support 54 which can be oriented perpendicular to each other. The horizontal support 52 is associated with a horizontal carriage 56 and a resistance device, such as a spring 64. Similarly, the vertical support 54 is associated with a vertical carriage 58 and a vertical spring 66. Furthermore, the rigid arm 70 can be pivotally coupled to the horizontal 56 and vertical 58 carriages at point 60 and point 62, respectively. In the illustrated embodiment, point 60 at one end of the rigid arm 70 is coupled to the horizontal carriage 56 and intermediate point 62 located between the rigid arm 70 ends is coupled to the vertical carriage 58. Horizontal spring 64 urges the horizontal carriage 56 horizontally along a horizontal axis defined by the horizontal support 52 and the vertical spring 66 urges the vertical carriage 58 downwardly along a vertical axis defined by the vertical support 54. Therefore, according to Hooke's law, a force due to the horizontal spring 64 acting on the horizontal carriage 56 can be approximated by equation 1:

$$F_H = k_H x_H \quad \text{(Eq. 1)}$$

where $F_H$ is the component of horizontal force acting on the horizontal carriage 56 due to the horizontal spring 64, $x_H$ is the horizontal displacement and $k_H$ is the spring rate constant of spring 64. Similarly, a force on the vertical carriage 58 due to the vertical spring 66 can be approximated by equation 2:

$$F_V = k_V x_V \quad \text{(Eq. 2)}$$

where $F_V$ is the component of vertical force acting on the vertical carriage 58 due to the vertical spring 66, $x_V$ is the vertical displacement and $k_V$ is the spring rate constant of spring 66. It can be determined, as previously demonstrated in U.S. Pat. No. 7,874,223, that for the geometry shown in U.S. Pat. No. 7,874,223, when $k_V$ and $k_H$ are equivalent and horizontal support 52 and vertical support 54 are orientated perpendicular to each other:

$$F_R = k_V L \quad \text{(Eq. 3)}$$

where $F_R$ is the resultant force at carriage 58, and L is the length of the arm between point 60 and point 62 in FIG. 5. As $k_V$ and L are constant, the force $F_R$ is therefore constant. When an extension is made to the rigid arm as is the case in the illustrated embodiment, the force at the wheel $F_W$ is $$F_W = k_V L^2 / (L+S) \quad \text{(Eq. 4)}$$

where L is the length of the arm from point 60 to point 62 in FIG. 5 and S is the length of the arm from 62 to 86 in FIG. 5. Here again, because $k_V$, L and S are constant, the force $F_W$ is constant.

The result is that the downward force applied by the caster wheel remains constant throughout the stroke of the variable constant force mechanism 48. A secondary vertical spring 68 can be provided on the vertical support 54 coaxial with the vertical spring 66 that applies a greater downward force once the deflection exceeds the predefined constant force region to provide a preferred roll stiffness.

A constant force caster requires less maintenance or a reduced maintenance frequency. Tuning of the caster force profile allows the material handling vehicle equipped with the wheel configuration 10 to maintain optimal vehicle performance as the drive wheel 16 wears with reduced maintenance frequency.

Several alternative methods exist for constructing a wheel support 10 with a constant force mechanism. In lieu of the variable constant force mechanism detailed in FIG. 5, and the constant force mechanism shown in FIGS. 6-8B, a cam and follower could be used. The cam profile would be shaped to achieve the desired force profile. Likewise, a cam pulley could be used in the same fashion. Other mechanisms are available that create constant forces which are well known in the art.

Figure 10A:
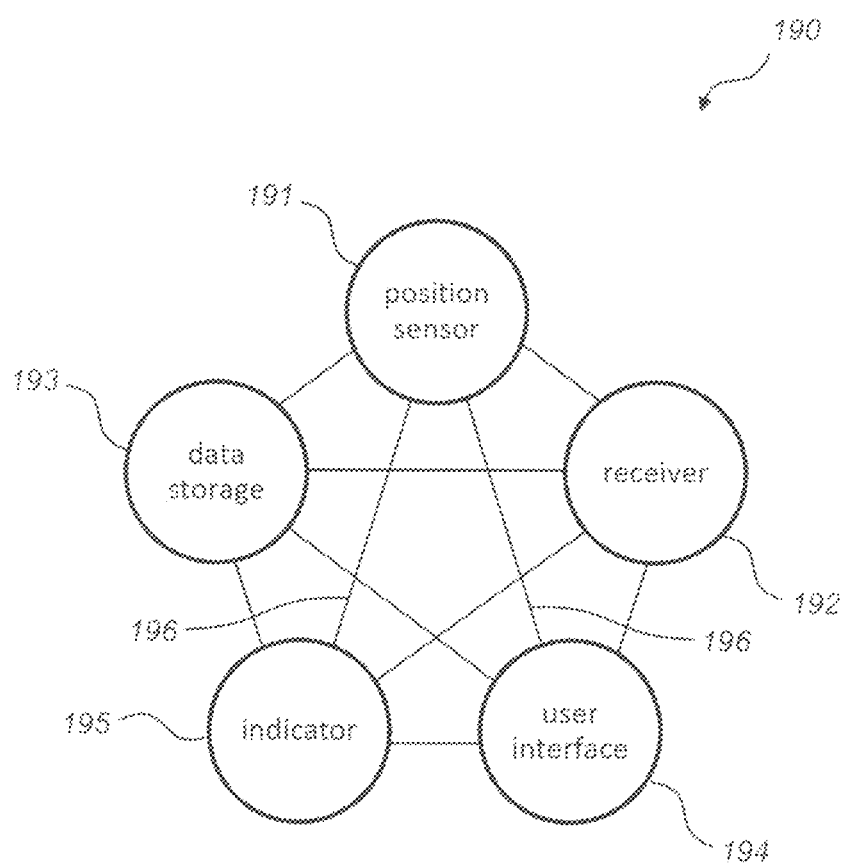
FIG. 10A is a schematic illustration of an embodiment of a position sensor system.

In addition to the wheel assembly, a material handling vehicle such as vehicle 100 can be equipped with a position sensor system 190. FIG. 10A shows a schematic illustration of one embodiment of a position sensor system 190 which can include one or more sensors 191, a receiver 192, data storage 193, user interface 194 and indicator 195. In one aspect, each of the components of the position sensor system 190 can be in communication with each of the other components of the position sensor system 190.

Figure 10B:
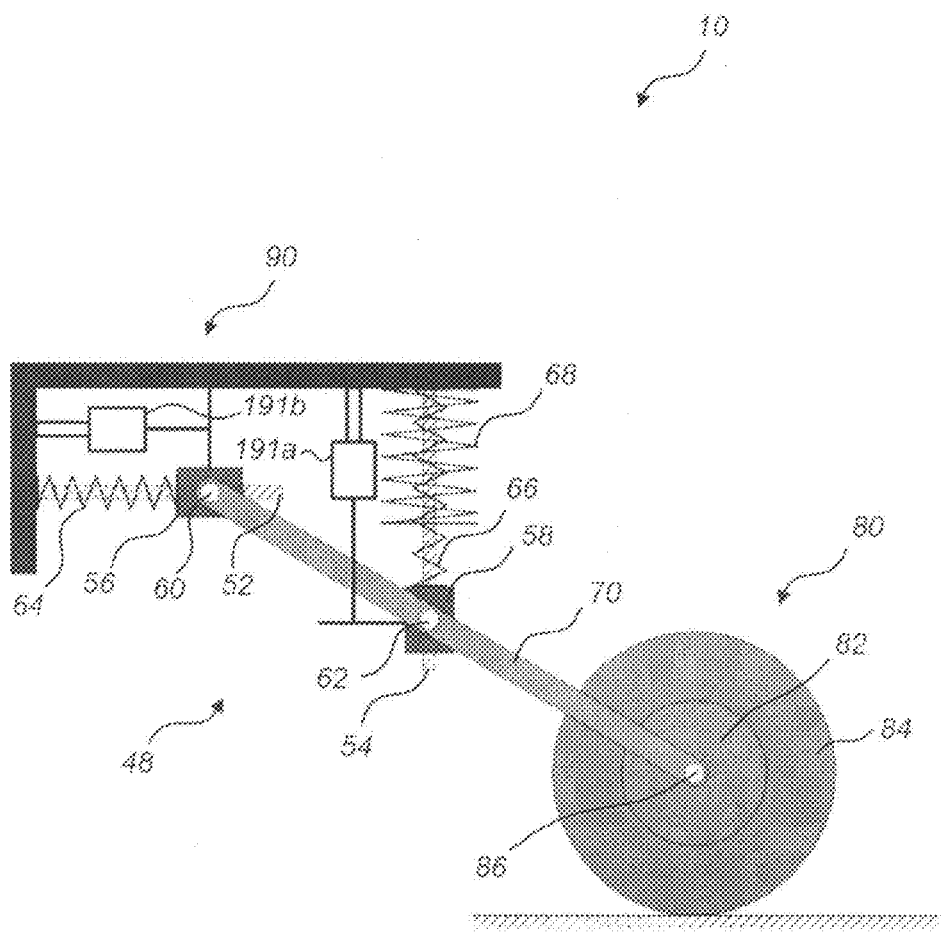
FIG. 10B is a schematic illustration of an embodiment of a caster with a variable constant force mechanism and including position sensors as part of a position sensor system.

With reference to FIG. 10B, the wheel assembly shown in FIG. 5 is illustrated showing possible locations of an exemplary position sensor 191. The position sensor 191 can measure a deflection across the caster and output a position or deflection value (see FIG. 11). The deflection provides an indication of the amount of wear (e.g., reduction in drive wheel 16 diameter) that has occurred. In one embodiment, the position sensor 191 can be a linear encoder and can be used to measure a deflection across the caster wheel (e.g., at a caster-arm pivot point). In some embodiments, the variable constant force mechanism 48 can perform best within a defined range of deflection. For example, when the measured deflection exceeds a predetermined threshold, a signal 196 can be generated by the position sensor system 190 to initiate a notice with an indicator 195 (e.g., warning message/indicator, email alert, etc.) advising personnel that the constant force caster wheel assembly measured deflection is exceeding the predetermined threshold. In one aspect, an indicator 195 can provide a notice through a user interface 194.

In some embodiments, the signal 196 can be communicated wirelessly via a bidirectional warehouse communication system with a computer system at a facility, such as a warehouse or a factory, where the vehicle operates. This enables data regarding the operating parameters to be sent to the computer system and enables the pallet truck 100 to receive data and commands from the computer system. Additionally, the warehouse communication system can be connectable through a network, such as the Intranet, to remote computers, such as at the headquarters of the company that operates the facility and at the manufacturer of the vehicle.

FIG. 10B illustrates two linear position sensors 191a and 191b. Vertical position sensor 191a can detect a vertical displacement of the vertical carriage 58, and horizontal position sensor 191b can detect a horizontal displacement of the horizontal carriage 56. In some embodiments, horizontal position sensor 191b (or vertical position sensor 191a) can serve as a back-up to vertical position sensor 191b (or horizontal position sensor 191b) to provide a redundant position sensor system. Moreover, although two linear position sensors are shown, it is to be understood that a single position sensor 191 may be included in the design of the wheel assembly 10 without departing from the scope of the invention. If a single position sensor 191 is provided, the single position sensor 191 can measure the displacement of either one of the carriages 56, 58. In still other embodiments, a single position sensor can be arranged to monitor both carriages 56, 58 simultaneously.

Figure 11:
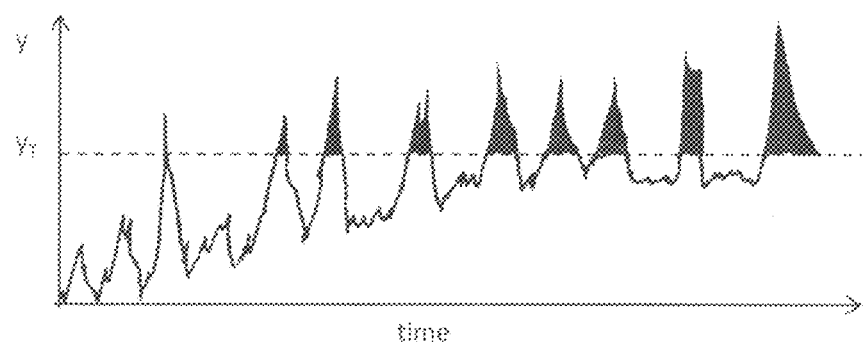
FIG. 11 is an example of a drive wheel wear profile showing drive wheel wear over time as monitored by a position sensor system.

Referring to FIG. 11, a plot of an example of a drive wheel wear profile is shown. The drive wheel wear as a function of time is monitored by way of the position sensor, such as sensor 191. In the case of a vertical position sensor, the displacement of the vertical carriage 54 can be plotted as a function of time, where y represents that displacement and $y_T$ represents a threshold value. In FIG. 11, an upward displacement (resulting in a compression of the vertical spring) results in an increase of the value of y, whereas a downward displacement (resulting in an extension of the spring) results in a decrease of the value of y. The threshold value $y_T$ may be predetermined (e.g., a factory setting) or set by a user.

Figure 12:
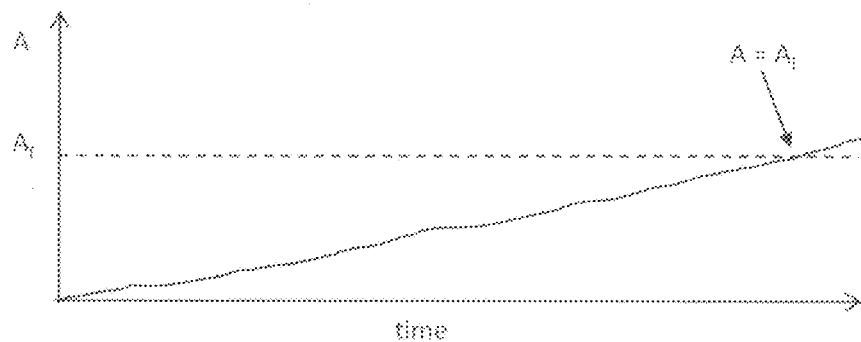
FIG. 12 is a plot showing an integration of the wear profile illustrated in FIG. 11 for values of $y > y_T$.

FIG. 12 shows a plot of an integration of the wear profile illustrated in FIG. 11 for values of $y > y_T$. In other words, the cumulative area (A) under the curve of the wear profile in FIG. 11 (shaded regions) can be monitored for displacements greater than the threshold displacement value. When the value of A equals or exceeds a threshold value $A_T$, a signal can be generated. The arrow in FIG. 12 indicates the point on the plot at which $A = A_T$. In a manner similar to the selection of $y_T$, $A_T$ may also be predetermined (e.g., a factory setting) or set by a user. The signal generated can indicate that the drive wheel may need to be repaired or replaced. Details regarding the signal are described below.

Figure 13:
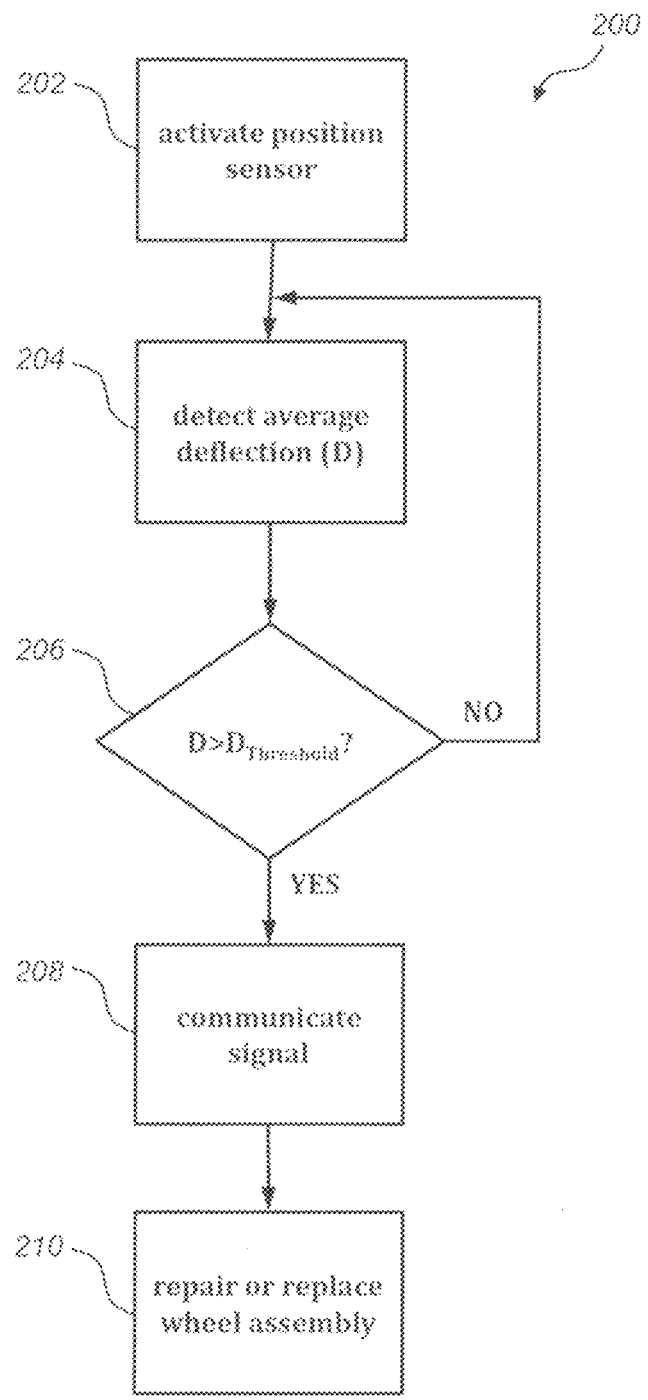
FIG. 13 is an illustration of a method for operating a position sensor system to send an indication signal.

Referring to FIG. 13, an embodiment of a process incorporating a position sensor system 190 is illustrated as a method 200. In step 202 of the method 200, the position sensor system 190 and the position sensor 191 can be activated. Activation of the position sensor system 190 can occur when the vehicle is powered on or can occur intermittently while the vehicle is in operation. In addition, the position sensor system 190 can be activated manually or automatically. For example, a user can choose to activate the position sensor system 190 to periodically determine whether a wheel assembly requires maintenance. In some embodiments, the position sensor system 190 can be reset, for example, following a maintenance procedure. Alternatively, the position sensor system 190 can be continuously active regardless of the status of the vehicle.

In a second step 204 of the method 200, the position sensor 191 can detect a property of a wheel assembly such as wheel assembly 10. The position sensor 191 can be configured to detect the deflection or average deflection of the wheel. In the case where the average deflection is detected, an average deflection value (D) can be recorded. In one example, deflection data can be transmitted from the position sensor 191 to a receiver 192 that can record the deflection data in data storage 193. In certain embodiments, D can be equivalent to y or A as seen in FIGS. 11-12. In a next step 206 of the method 200, D can be compared with a predetermined threshold value ($D_{Threshold}$). In certain embodiments, $D_{Threshold}$ can be equivalent to $y_T$ or $A_T$ as seen in FIGS. 11-12. $D_{Threshold}$ can be chosen to indicate when a signal could be communicated to a user. For example, a user can be notified with an indicator 195 to indicate when the wheel assembly requires maintenance, which can include repairing or replacing the wheel. Based on the degree of wheel wear, $D_{Threshold}$ may be selected to be a value that can be indicative of a level of wheel wear at which maintenance could be considered. Therefore, in a step 206, if D is greater than $D_{Threshold}$, than in a next step 208 of the method 200, a signal can be communicated to a user. However, if D is less than or equal to $D_{Threshold}$, then the method 200 can return to step 204.

In the case where D exceeds $D_{Threshold}$, a user can be notified by the position sensor system 190. The notification can include a signal 196 sent by a wired or wireless communication method to a device such as a computer, cell phone, tablet or other such device or user interface 194. The notification can also include an audible or visual notification such as an intermittent or constant audible tone or light display provided by an indicator 195. When the notification is received by the user, in a step 210, the user may choose to repair or replace the wheel assembly based on the signal communicated by the position sensor system 190.

Figure 14:
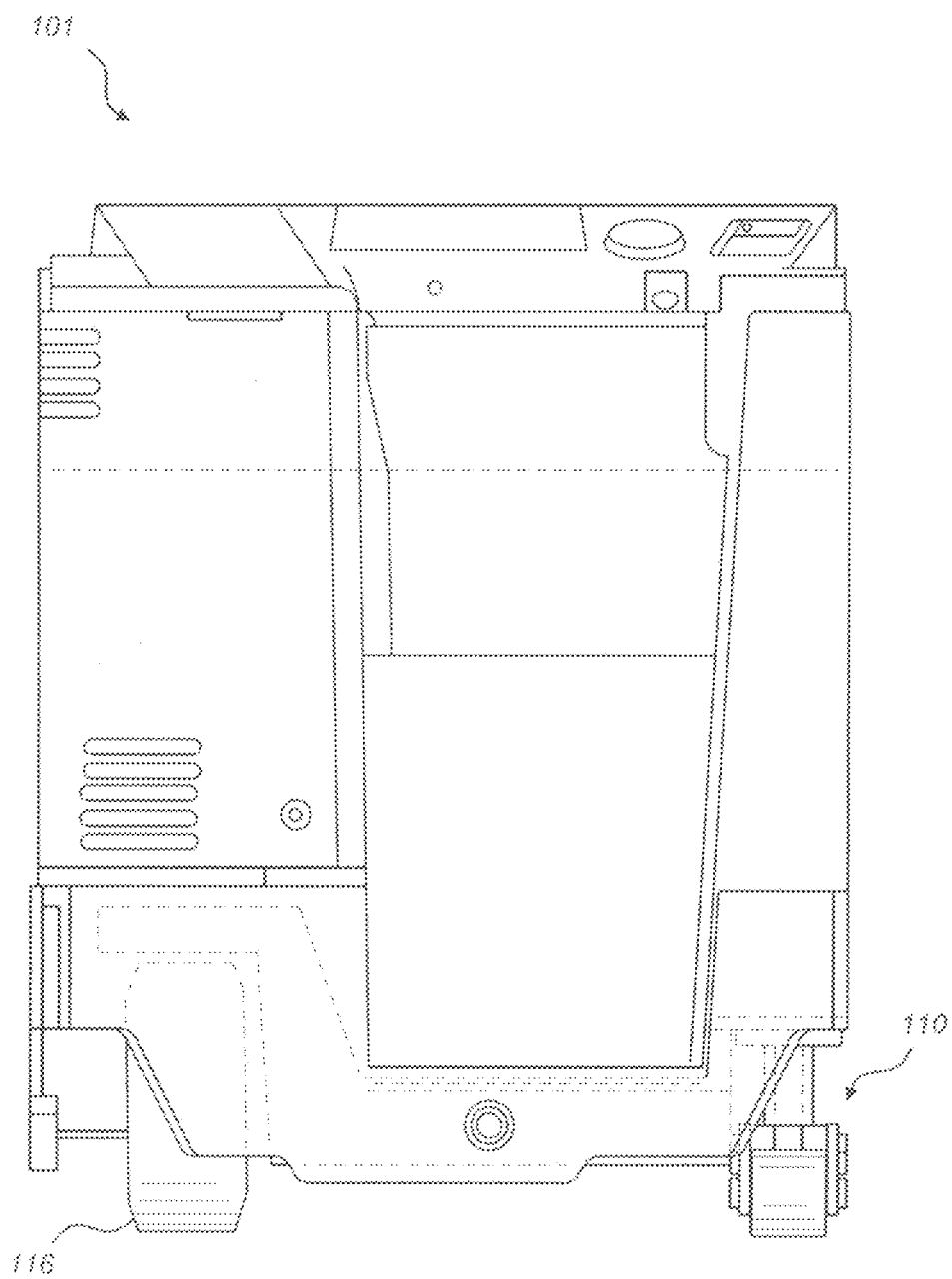
FIG. 14 is a rear view of a material handling vehicle equipped with a caster wheel assembly including a variable constant force mechanism according to the present disclosure.
Figure 15:
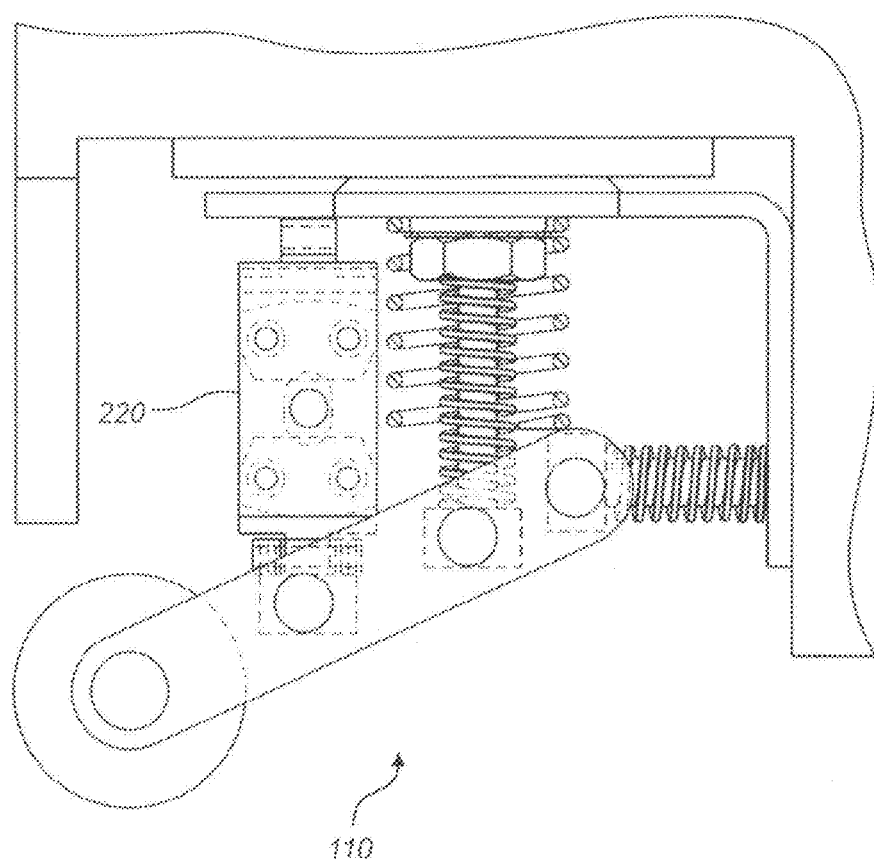
FIG. 15 is an enlarged partial side view of the material handling vehicle of FIG. 14 showing the caster wheel assembly including the variable constant force mechanism and an inertial damper.

In a further embodiment, a single caster wheel assembly including a constant force mechanism may be used on a material handling vehicle. As a non-limiting example, a caster wheel assembly including a constant force mechanism 50, or variable constant force mechanism 48 may be used on a reach truck. In general, a known reach truck may include a caster wheel and inertial damper assembly with coil springs and an inertial damper to dissipate energy. One embodiment of a reach truck 101 according to the present technology can include a single wheel assembly 110, as shown in FIGS. 14 and 15. The coil springs associated with a known caster wheel may be replaced with a constant force mechanism 50, or variable constant force mechanism 48 to provide wheel assembly 110. In one aspect, the wheel assembly 110 may exert a constant force on a ground surface as the drive wheel 116 wears. In another aspect, wheel assembly 110 may function similarly to wheel assembly 10 as shown, for example, in FIG. 5. It will be appreciated that embodiments of a reach truck 101 or other material handling vehicles may include only one wheel assembly 110 with a constant force mechanism. However, embodiments of a reach truck 101 or other material handling vehicles may also include two or more wheel assemblies 110. In some embodiments, the wheel assembly 110 can also include an inertial damper 220 to help dissipate energy.

Other constant force mechanisms in addition to those described herein and other mechanisms in general may also be used. For example, as an alternative (or in addition) to a caster wheel assembly including a constant force mechanism, a cam and follower may be used. A cam profile may be shaped to achieve a desired force profile. In another aspect, a cam pulley may be used in addition to or in place of a cam and follower.

While there has been shown and described what is at present considered the preferred embodiments of the invention, it will be appreciated by those skilled in the art that, given the benefit of this disclosure, various changes and modifications can be made without departing from the scope of the invention defined by the following claims.

We claim:

1. A wheel assembly comprising:
   a constant force mechanism;
   a wheel coupled to the constant force mechanism, the wheel being displaceable in at least one dimension;
   a first position sensor that can detect at least one of a vertical displacement and a horizontal displacement of the wheel on the wheel assembly;
   a second position sensor that can detect the other of the at least one of the vertical displacement and the horizontal displacement of the wheel; and
   the constant force mechanism imparts a substantially constant force on the wheel in the at least one dimension,
   wherein for a wheel displacement greater than a predetermined wheel displacement, the constant force mechanism imparts a variable force on the wheel, and
   wherein the variable force is equal to or greater than the substantially constant force.

2. The wheel assembly of claim 1, wherein the first position sensor measures a deflection of the wheel, the first position sensor being in communication with a sensor system, and the sensor system generates a signal when the measured deflection of the wheel exceeds a predetermined threshold.

3. The wheel assembly of claim 2, wherein the signal communicates the deflection of the wheel.

4. The wheel assembly of claim 2, wherein the sensor system is configured to determine an average deflection across the wheel.

5. The wheel assembly of claim 2, wherein the signal indicates that the wheel could require maintenance.

6. The wheel assembly of claim 1, wherein the constant force mechanism is coupled to a vehicle.

7. The wheel assembly of claim 6, wherein the vehicle is a material handling vehicle.

8. The wheel assembly of claim 1, wherein the constant force mechanism includes:
   a first support structure and a second support structure, the first support structure being arranged at a substantially right angle to the second support structure;
   a first carriage movable along a length of the first support structure;
   a second carriage movable along a length of the second support structure;
   a rigid arm pivotally connected to the first and second carriages;
   a first resistance device opposing movement of the first carriage along the length of the first support structure; and
   a second resistance device opposing movement of the second carriage along the length of the second support structure.

9. The wheel assembly of claim 8, where the constant force mechanism is a variable constant force mechanism.

10. The wheel assembly of claim 8, further including a third resistance device opposing movement of one of the first and second carriages; and
    in a first regime, the constant force mechanism imparts the substantially constant force on the wheel for a translational displacement less than a distance X along one of the length of the first support structure and the length of the second support structure, and in a second regime, the constant force mechanism imparts the variable force on the wheel for a translational displacement equal to or greater than the distance X along one of the length of the first support structure and the length of the second support structure.

11. The wheel assembly of claim 1, wherein the wheel is at least one of a load wheel, a drive wheel, a caster wheel, and a steering wheel.

12. A method of indicating a maintenance requirement, the method comprising:
    providing a vertical position sensor configured to measure a vertical deflection of a wheel on a wheel assembly on a material handling vehicle;
    providing a horizontal position sensor configured to measure a horizontal deflection of the wheel on the wheel assembly;
    measuring the deflection of the wheel; and
    communicating a signal representing the deflection of the wheel, wherein the signal provides an indication for maintenance of the wheel assembly,
    wherein the wheel assembly includes a constant force mechanism and the wheel coupled to the constant force mechanism, the wheel being displaceable in a first regime,
    wherein for a wheel displacement in the first regime, the method further includes imparting a substantially constant force on the wheel, and
    wherein the signal is communicated when the deflection of the wheel exceeds a predetermined threshold.

13. The method of claim 12, further including a second regime, and for a wheel displacement in the second wheel regime, the method further includes imparting a variable force on the wheel, the variable force being proportional to the magnitude of the displacement in the second regime equal to or greater than the substantially constant force, and the signal is communicated when the wheel displacement is in the second regime.

14. The method of claim 12, wherein the vertical position sensor is a linear encoder for measuring the deflection across the wheel.

15. The method of claim 14, wherein the step of communicating a signal representing the deflection of the wheel assembly occurs when the deflection across the wheel exceeds a predetermined threshold.

16. A material handling vehicle comprising:
a vehicle chassis;
a fork carriage coupled to the vehicle chassis;
at least one lifting fork coupled to the fork carriage and displaceable in at least one dimension;
a drive wheel coupled to the vehicle chassis;
at least one caster wheel assembly coupled to the vehicle chassis, the at least one caster wheel assembly including a constant force mechanism, a first position sensor, a second position sensor, and a caster wheel, the caster wheel coupled to the constant force mechanism, the first position sensor positioned to measure a vertical deflection across the caster wheel, and the second position sensor positioned to measure a horizontal deflection across the caster wheel; and
the constant force mechanism exerts a substantially constant force on the caster wheel resisting displacement of the caster wheel in a first regime, and exerts a variable force on the caster wheel in a second regime.

17. The material handling vehicle of claim 16, wherein the caster wheel assembly includes a second position sensor to measure a horizontal deflection of the caster wheel.

18. The material handling vehicle of claim 17, wherein the first position sensor measures a vertical deflection of the caster wheel, the first position sensor being in communication with a sensor system, and the sensor system generates a signal when a measured vertical deflection of the caster wheel exceeds a predetermined threshold.

19. The material handling vehicle of claim 18, wherein the signal indicates that the caster wheel requires maintenance.

20. The wheel assembly of claim 2, wherein the signal indicates a wear on a second wheel.

21. The wheel assembly of claim 20, wherein the constant force mechanism is coupled to a vehicle; and wherein the second wheel is at least one of a load wheel, a drive wheel, a caster wheel, and a steering wheel.

22. The wheel assembly of claim 1, wherein the first position sensor is a linear position sensor.

23. The material handling vehicle of claim 16, wherein the first position sensor is a linear position sensor.

* * * * *